July 2, 1968

R. G. SCHIMPF 3,391,042

METHOD OF MAKING A PLASTIC TUBE
BUNDLE FOR HEAT EXCHANGE
Filed Nov. 2, 1964

INVENTOR
ROBERT G. SCHIMPF

BY *Herbert M Wolfson*

ATTORNEY

3,391,042
METHOD OF MAKING A PLASTIC TUBE BUNDLE FOR HEAT EXCHANGE
Robert G. Schimpf, Wilmington, Del., assignor to E. I. du Pont de Nemours and Company, Wilmington, Del., a corporation of Delaware
Filed Nov. 2, 1964, Ser. No. 408,289
2 Claims. (Cl. 156—174)

ABSTRACT OF THE DISCLOSURE

A process for preparing a tube bundle that involves preparing a flat warp of spaced substantially parallel plastic tubes, the tubes being spaced by the use of at least one length of plastic tape bonded to the surfaces of the tubes, by traversing at least one tube to form loops about two sets of pins, the sets being spaced from each other by a distance equal to the length of the tubes in the warp, applying the tape in a direction substantially perpendicular to the traversals of the tube and then cutting the loops in a path parallel to the tape; and then convolutely winding the tape of the warp about an axis parallel to an edge tube to form the bundle.

---

This invention relates to heat exchangers, and more particularly, to an improved process for preparing a bundle of plastic tubes for heat exchange use.

There are numerous industrial operations which require apparatus for transferring heat between fluid masses wherein at least one of the fluids is corrosive. Such operations include the cooling of hot corrosive acids, the use of polluted river water or brackish sea water for cooling where an adequate supply of good water is not available, the rapid heating or cooling of foodstuffs, etc.

The use of plastic tubes in a heat exchanger for such operations would seem to be a logical possibility. However, because such materials possess inherently low thermal conductivities, they must be used as small-diameter, thin-walled tubes. Such tubes are flexible and tend to be extremely sensitive to changes in temperature. Attempts to fabricate successfully such tubes into heat exchangers has been heretofore a virtually insurmountable task.

In U.S. patent application Ser. No. 389,109, filed Aug. 12, 1964 now U.S. Patent No. 3,277,959, and assigned to the assignee of the present application, is described a novel heat exchanger that is compact, lightweight, etc., yet has a heat transfer capacity comparable to an all-metal tube and shell heat exchanger. A process for converting tubular plastic materials, such as the polymers of fluorocarbons, amides, acetals, olefins, vinyl halides, styrene, etc. into the novel tube and shell heat exchanger is also described. Basically, the process described involves forming a tube bundle by first preparing a warp of parallel, hollow, polymeric filaments, the width of the warp being defined by its two edge filaments and bonding a plurality of spaced tapes, at least one of which tapes is disposed at an angle of 90 degrees to the filaments of the warp, the length of a tape that is disposed at an angle of 90 degrees to the warp being longer than the width of the warp to provide a trailing tab. Thereafter, by convolutely winding the tapes about an edge filament as the axis and bonding the trailing tab to the previous turn of the tape, the tube bundle is formed and can be used in the preparation of the heat exchanger.

It is an object of the present invention to provide a novel process for forming the aforementioned tube bundle. It is a further object to provide a process for forming a tube bundle that can employ a single, continuous hollow filament. Other objects will appear hereinafter.

The objects are accomplished by first forming a warp of hollow filaments by lacing or traversing at least one continuous hollow filament about two sets of pins to provide a loop about each pin, the two sets of pins being spaced from each other by a constant distance approximately equal to the length of the proposed warp, the pins in each set about which a common filament is looped being substantially parallel, adjacent pins in a set being spaced from each other by a distance equal to twice the pitch, i.e., twice the distance between adjacent filaments in the warp, the diameter of each pin being equal to the distance between adjacent filaments in the warp less two wall thicknesses of the hollow filament, the number of traversals of said filament being equal to the number of individual filaments in said warp; bonding at least one length of tape, preferably bonding a plurality of spaced tapes, to the surfaces of each traversal of the continuous hollow filament, said tape being disposed substantially perpendicular to said traversals of said filament and, preferably, extending beyond the final traversal of said filament; cutting the loops of said filament (which have been flattened by passing around the pins) to provide the warp of substantially parallel hollow filaments bonded by at least one tape, preferably by a plurality of spaced tapes. To form the tube bundle, the warp is convolutely wound about an edge filament as the axis in the manner described in U.S. patent application Ser. No. 389,109 now U.S. Patent No. 3,277,959.

The invention will be more clearly understood by referring to the drawing in which.

Figure 1:
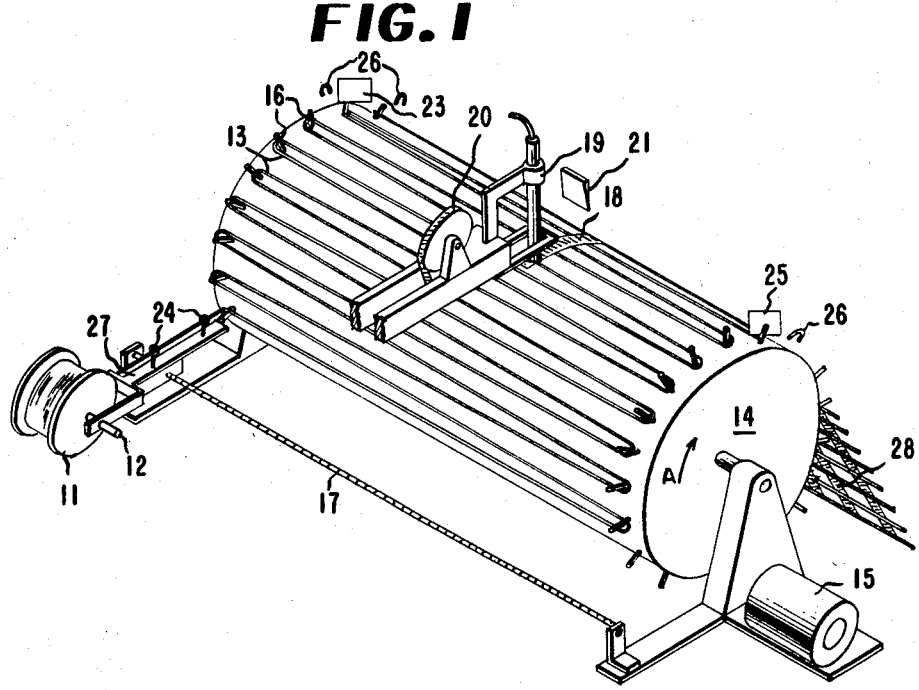
FIGURE 1 is a schematic illustration of apparatus for carrying out one process within the scope of this invention.

In the process carried out using the apparatus illustrated in FIGURE 1, a spool 11 containing a continuously wound length of the hollow filament is used. The hollow filament is preferably composed of a fluorocarbon polymeric material and may be anywhere from 0.08 inch to 0.25 inch in outside diameter with a wall thickness that is from 5% to 15% of the outside diameter. The spool 11 is rotatably mounted on mandrel 12. A length of the filament 13 is unwound and anchored by looping around a pin 16 and affixing the filament to itself. The drum 14 is rotated in the direction shown by the arrow A by using motor means such as 15. As drum 14 is rotated, the hollow filament 13 is unwound from spool 11, guided through the guides 24 on the support 27. The support 27 is reciprocated by means, not shown, along the track 17. The rate of reciprocation and the rotation rate of the drum 14 are synchronized in a manner to lace the filament 13 around the radial pins 16. Reciprocation is delayed when the filament 13 arrives at its two extreme position to permit the filament to wrap securely around the pins 16.

Tape spools 20 along with hot air guns 19 are spaced from the drum. Although only a single tape spool-hot air gun unit is shown in the drawing, it should be understood that the use of a plurality of such units is preferred. As the drum 14 is rotated, spacer tapes 18 are unwound from spools 20 and welded by the hot air guns 19 to the surface of the hollow filament 13, the hot air from gun 19 serving to melt the surfaces of tape and filament to effect a weld. In the preferred situation, the pins 16 are staggered in a manner such that the tapes laid down by spools 20 are substantially perpendicular to the traversals of the filament. The tapes 18 may be composed of any material, but are preferably composed of the identical fluorocarbon polymeric material as the filaments. The tapes are usually about 0.010 inch thick and ⅜ to ½ inch wide. Although localized heat bonding is shown in the drawing, any suitable adhesive or solvent bonding technique may be employed.

Figure 2:
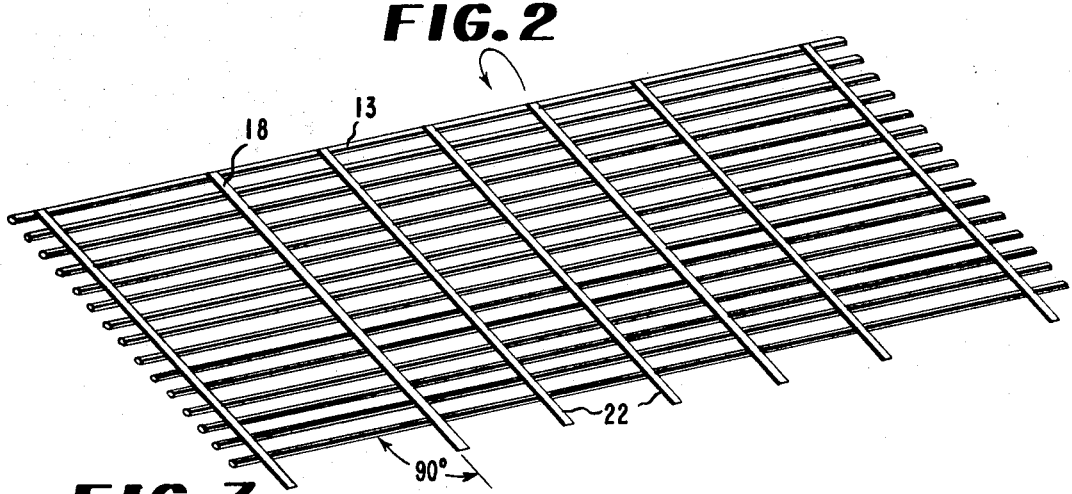
FIGURE 2 is a layout view of the warp sheet produced by the described process prior to coiling to form the tube bundle.

Upon further rotation of the cylindrical drum 14, knives 23 and 25 cut off the loops 26 and provide the part 28 of the warp sheet of a plurality of spaced filaments 13 held together by tapes 18 bonded to their surfaces. The warp sheet may be wound on a rotatable storage mandrel, not shown, rotating at the same surface speed as drum 14. When the desired number of filaments, as determined by the number of lacings or traversals of filament 13 on the surface of drum 14, are obtained, filament 13 is cut by means, not shown, and looped around a pin 16 and anchored to itself. Rotation of the drum 14 continues to pass the final traversal of the filament 13 under tape spools 20. Cut-off knives 21 then sever the tapes 18 in a manner to provide a trailing tape tab 22. Knives 23 and 25 cut off the final loops 26 to provide the final warp sheet. The warp sheet, as shown in FIGURE 2, consists of the substantially parallel hollow filaments 13 having the spacers 18 bonded to their surfaces in the manner shown. One advantage of this process is that the number of filaments obtainable in any warp sheet is virtually unlimited. The number is not limited by the dimensions of the device, but is only limited by the capacity of the filament supply. Conceivably, this apparatus can be supplied with a filament from a continuous extruder.

Figure 3:
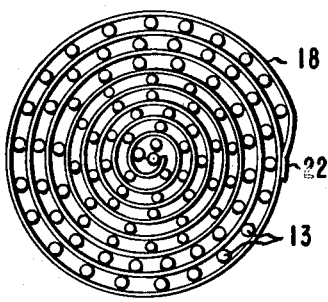
FIGURE 3 is a sectional end view of the tube bundle formed by coiling the warp sheet shown in FIGURE 2.

After the warp of substantially evenly spaced, parallel filaments is formed, it is tightly rolled or convolutely wound by hand or mechanically about an axis parallel to an edge filament, with or without the use of a removable mandrel, to provide the tube bundle shown in FIGURE 3. In winding, the tapes are wound preferably in a manner that places them on the outside of the filament bundle, usually in pattern on themselves, but separated by the diameter of the hollow filaments. When coiling is completed, the trailing tape tabs or ends are each welded or otherwise bonded to their preceding coils, thereby restraining the bundle of filaments in a substantially cylindrical (cross-section) pattern and forming a semi-rigid structure which is essentially self-supporting.

The ends of the tube bundle may then be gathered into a fluid-tight arrangement while maintaining the openings in the hollow filaments by any method. One method is disclosed in U.S. Patent No. 3,315,740.

What is claimed is:

1. A process for preparing a tube bundle which comprises the steps, in sequence, of forming a flat warp of spaced, substantially parallel, hollow plastic filaments by traversing at least one continuous hollow plastic filament about two sets of pins to provide a loop about each pin, said two sets being spaced from each other by a constant distance approximately equal to the length of the filaments in said warp, the pins in each set about which a common filament in said warp is looped, being substantially parallel, adjacent pins in a set being spaced from each other by a distance equal to twice the distance between adjacent filaments in said warp, the diameter of each pin being equal to the distance between adjacent filaments in said warp less two wall thicknesses of a filament, the number of traversals of said filament being equal to the number of filaments in said warp; bonding at least one length of plastic tape to the surfaces of said traversals of said filament, said tape being disposed substantially perpendicular to said traversals of said filament; cutting said loops of said filament about said pins in a single straight path substantially parallel to said tape to form said warp of spaced, substantially parallel, hollow filaments; convolutely winding said tape about an axis parallel to an edge filament to form a tube bundle wherein said tape spaces said filaments from each other to provide interstices between said filaments.

2. A process for preparing a tube bundle which comprises rotating a cylindrical drum having two sets of radial pins, said two sets being spaced from each other by a constant distance approximately equal to the length of the filaments in said warp, adjacent pins in each set being spaced from each other by a distance equal to twice the distance between adjacent filaments in said warp, the diameter of each pin being equal to the distance between adjacent filaments in said warp less two wall thicknesses of a filament; traversing at least one continuous hollow plastic filament about said two sets of pins to provide a loop about each pin in a manner such that the pins in each set about which a single traversal is looped are substantially parallel; unwinding at least one length of plastic tape over the surfaces of said traversals of said filament in a path substantially perpendicular to said traversals; bonding said tape to said surfaces; cutting said loops of said filament about said pins in a single straight path substantially parallel to said tape; cutting said tape after the final traversal; convolutely winding said tape about an axis parallel to an edge filament to form a tube bundle wherein said tape spaces said filaments from each other to provide interstices between said filaments.

References Cited

UNITED STATES PATENTS

| | | | |
|---|---|---|---|
| 2,862,541 | 12/1958 | Brink | 156—174 XR |
| 2,962,080 | 11/1960 | Hirsch | 156—440 |
| 3,303,075 | 2/1967 | Rabus | 156—297 XR |

EARL M. BERGERT, *Primary Examiner.*

PHILIP DIER, *Examiner.*